United States Patent [19]

Nakajima et al.

[11] Patent Number: 5,018,199
[45] Date of Patent: May 21, 1991

[54] CODE-CONVERSION METHOD AND APPARATUS FOR ANALYZING AND SYNTHESIZING HUMAN SPEECH

[75] Inventors: Takao Nakajima; Hiroshi Shigehara, both of Yokohama, Japan

[73] Assignee: Kabushiki Kaisha Toshiba, Kawasaki, Japan

[21] Appl. No.: 423,571

[22] Filed: Sep. 1, 1989

Related U.S. Application Data

[63] Continuation of Ser. No. 751,512, Jul. 3, 1985, abandoned.

[30] Foreign Application Priority Data

Jul. 4, 1984 [JP] Japan .................................. 59-138703
Jul. 4, 1984 [JP] Japan .................................. 59-138704

[51] Int. Cl.$^5$ ............................ G10L 3/00; G06F 5/00
[52] U.S. Cl. .................................... 381/36; 381/30; 341/50; 341/95
[58] Field of Search ............... 340/50, 88, 90, 60, 340/63, 95; 364/513.5; 381/29-40

[56] References Cited

U.S. PATENT DOCUMENTS

| | | | |
|---|---|---|---|
| 3,577,142 | 5/1971 | McMillin | 341/90 |
| 3,821,711 | 6/1974 | Elam et al. | 341/95 |
| 3,860,908 | 1/1975 | Stratton, III | 341/88 |
| 3,925,780 | 12/1975 | Van Voorhis | 341/63 |
| 4,304,965 | 12/1981 | Blanton et al. | 381/39 |
| 4,360,708 | 11/1982 | Taguchi et al. | 381/36 |
| 4,701,746 | 10/1987 | Ueda et al. | 341/95 |

FOREIGN PATENT DOCUMENTS

56-161598 12/1981 Japan .
58-66440 4/1983 Japan .

*Primary Examiner*—Dale M. Shaw
*Assistant Examiner*—David D. Knepper
*Attorney, Agent, or Firm*—Foley & Lardner

[57] ABSTRACT

Human speech is analyzed and a feature parameter is extracted from the human speech. The feature parameter is quantized and a quantization parameter is generated. Part of the bits of the quantization parameter is a predetermined bit pattern when the feature parameter is in a predetermined range. The part of the bits of the quantization parameter is tranformed into an additive parameter of at least one bit. The human speech is synthesized on the basis of the quantization parameter and the additive parameter. It is possible to nonlinearly quantize human speech into a quantization parameter having a small number of bits and to generate the synthesis parameter from the quantization parameter using a small size circuit.

19 Claims, 7 Drawing Sheets

| SYNTHESIS PARAMETER | | | | |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| -2 | 0 | 1 | 1 | 0 |
| -1 | 1 | 1 | 1 | 1 |

↑
OUTPUT OF ROM 25

FIG. 2B

| QUANTIZATION PARAMETER | | | |
|---|---|---|---|
| 0 | 0 | 0 | 0 |
| 1 | 0 | 0 | 1 |
| 2 | 0 | 1 | 0 |
| 3 | 0 | 1 | 1 |
| -4 | 1 | 0 | 0 |
| -3 | 1 | 0 | 1 |
| -2 | 1 | 1 | 0 |
| -1 | 1 | 1 | 1 |

↑
INPUT OF ROM 25

FIG. 2C

| TRANSFORMATION ROM | | |
|---|---|---|
| INPUT | | OUTPUT |
| 0 0 | | 0 |
| 0 1 | | 0 |
| 1 0 | | 0 |
| 1 1 | | 1 |

FIG. 4A

| SYNTHESIS PARAMETER | | | | |
|---|---|---|---|---|
| 8 | 1 | 0 | 0 | 0 |
| 9 | 1 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |

↑
OUTPUT OF CIRCUIT 28

FIG. 4B

| QUANTIZATION PARAMETER | | | |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

↑
INPUT OF CIRCUIT 27

| SYNTHESIS PARAMETER | | | | |
|---|---|---|---|---|
| 8 | 1 | 0 0 | 0 |
| 9 | 1 | 0 0 | 1 |
| 2 | 0 | 0 1 | 0 |
| 3 | 0 | 0 1 | 1 |
| 4 | 0 | 1 0 | 0 |
| 5 | 0 | 1 0 | 1 |
| 6 | 0 | 1 1 | 0 |
| 7 | 0 | 1 1 | 1 |

- OUTPUT OF ROM 32
- QUANTIZATION PARAMETER
- OUTPUT OF CIRCUIT 33

FIG. 6B

| QUANTIZATION PARAMETER | | | |
|---|---|---|---|
| 0 | 0 0 | 0 |
| 1 | 0 0 | 1 |
| 2 | 0 1 | 0 |
| 3 | 0 1 | 1 |
| 4 | 1 0 | 0 |
| 5 | 1 0 | 1 |
| 6 | 1 1 | 0 |
| 7 | 1 1 | 1 |

- INPUT OF ROM 32
- INPUT OF CIRCUIT 31

FIG. 6C

| TRANSFORMATION ROM | |
|---|---|
| INPUT | OUTPUT |
| 0 | 1 0 0 0 |
| 1 | 1 0 0 1 |

FIG. 7A

| SYNTHESIS PARAMETER | | | |
|---|---|---|---|
| 11 | 0 1 | 0 1 1 |
| 16 | 1 0 | 0 0 0 |
| 2 | 0 0 | 0 0 0 |
| 3 | 0 0 | 0 1 0 |
| 4 | 0 0 | 0 1 1 |
| 5 | 0 0 | 1 0 0 |
| 6 | 0 0 | 1 1 0 |
| 7 | 0 0 | 1 1 1 |

- OUTPUT OF ROM 32
- QUANTIZATION PARAMETER
- OUTPUT OF CIRCUIT 33

FIG. 7B

| QUANTIZATION PARAMETER | | | |
|---|---|---|---|
| 0 | 0 0 | 0 |
| 1 | 0 0 | 1 |
| 2 | 0 1 | 0 |
| 3 | 0 1 | 1 |
| 4 | 1 0 | 0 |
| 5 | 1 0 | 1 |
| 6 | 1 1 | 0 |
| 7 | 1 1 | 1 |

- INPUT OF ROM 32
- INPUT OF CIRCUIT 31

FIG. 7C

| TRANSFORMATION ROM | |
|---|---|
| INPUT | OUTPUT |
| 0 | 0 1 0 1 1 |
| 1 | 1 0 0 0 0 |

FIG. 9A

| SYNTHESIS PARAMETER | | | | |
|---|---|---|---|---|
| 0 | 0 | 0 0 0 | | OUTPUT OF ROM 39 |
| 1 | 0 | 0 0 1 | | |
| 2 | 0 | 0 1 0 | | QUANTIZATION PARAMETER |
| 3 | 0 | 0 1 1 | | |
| 5 | 0 | 1 0 1 | | OUTPUT OF ROM 32 |
| 8 | 1 | 0 0 0 | | |
| -2 | 1 | 1 1 0 | | QUANTIZATION PARAMETER |
| -1 | 1 | 1 1 1 | | |

OUTPUT OF ROM 39

FIG. 9B

| QUANTIZATION PARAMETER | | | |
|---|---|---|---|
| 0 | 0 0 | 0 | |
| 1 | 0 0 | 1 | |
| 2 | 0 1 | 0 | INPUT OF ROM 32 |
| 3 | 0 1 | 1 | |
| 4 | 1 0 | 0 | |
| 5 | 1 0 | 1 | |
| 6 | 1 1 | 0 | |
| 7 | 1 1 | 1 | |

INPUT OF ROM 39

FIG. 9C

| TRANSFORMATION ROM 32 | |
|---|---|
| INPUT | OUTPUT |
| 0 | 0 1 0 1 |
| 1 | 1 0 0 0 |

FIG. 9D

| TRANSFORMATION ROM 39 | | |
|---|---|---|
| INPUT | OUTPUT | SWITCHING SIGNAL |
| 0 0 | 0 | A |
| 0 1 | 0 | A |
| 1 0 | X | B |
| 1 1 | 1 | A |

X : DON'T CARE

5,018,199

CODE-CONVERSION METHOD AND APPARATUS FOR ANALYZING AND SYNTHESIZING HUMAN SPEECH

This application is a continuation of application Ser. No. 06/751,512, filed Jul. 3, 1985, now abandoned.

BACKGROUND OF THE INVENTION

The present invention relates to a method and an apparatus for analyzing and synthesizing human speech.

A speech analysis and synthesis device, which uses an analysis and synthesis method, such as LPC, PARCOR, LSP, or the Formant method, is well known. In order to compress human speech information, the device stores a quantization parameter as information representing human speech. The quantization parameter is generated by quantizing a feature parameter which is extracted from human speech. The device synthesizes human speech on the basis of the quantization parameter, In conventional devices, the feature parameter is linearly quantized so that the quantization parameter is proportional to the feature parameter. When the quantization parameter comprises N bits, the value of the quantization parameter ranges from 0 to $2^{N-1}$. Sometimes the distribution of the feature parameter is localized in the center of the range. However, it is not desirable to reduce the number N of bits of the quantization parameter. This is because the reduction of the number N of bits causes the range of the quantization parameter to be narrowed. This results in the problem that the quantization parameter has unnecessary redundancy.

In order to solve the above-mentioned problem, another conventional device quantizes a transformation parameter which is generated by nonlinearly transforming a feature parameter. The feature parameter can be represented by means of the quantization parameter having the necessary minimum number of bits. However, when nonlinearly quantizing, it is necessary to reversely and nonlinearly transform the quantization parameter to generate a synthesis parameter. This reverse and nonlinear transformation is extremely complicated. This results in the problem that the speech analysis and synthesis device requires very large circuits.

SUMMARY OF THE INVENTION

An object of the present invention is to provide a method and an apparatus for analyzing and synthesizing human speech which can quantize a feature parameter without distortion using a very small number of bits.

Another object of the present invention is to provide a method and an apparatus for analyzing and synthesizing human speech and which requires only a small circuit and which generates synthesized human speech of good quality.

To achieve these objects, the present invention provides a method of analyzing and synthesizing human speech comprising the steps of: analyzing the human speech to extract a feature parameter from the human speech; quantizing the feature parameter to generate a quantization parameter having a plurality of bits, a part of bits of the quantization parameter having a predetermined bit pattern when the feature parameter is in a predetermined range; transforming said part of bits of the quantization parameter into an additive parameter having at least one bit; and synthesizing the human speech on the basis of the quantization parameter and the additive parameter combined therewith.

To achieve these objects, the present invention provides an apparatus for analyzing and synthesizing human speech comprising: means for analyzing the human speech to extract a feature parameter from the human speech; means for quantizing the feature parameter to generate a quantization parameter having a plurality of bits, a part of bits of the quantization parameter having a predetermined bit pattern when the feature parameter is in a predetermined range; means for transforming said part of bits of the quantization parameter into an additive parameter having at least one bit; and means for synthesizing the human speech on the basis of the quantization parameter and the additive parameter combined therewith.

DETAILED DESCRIPTION OF THE INVENTION

Figure 1:
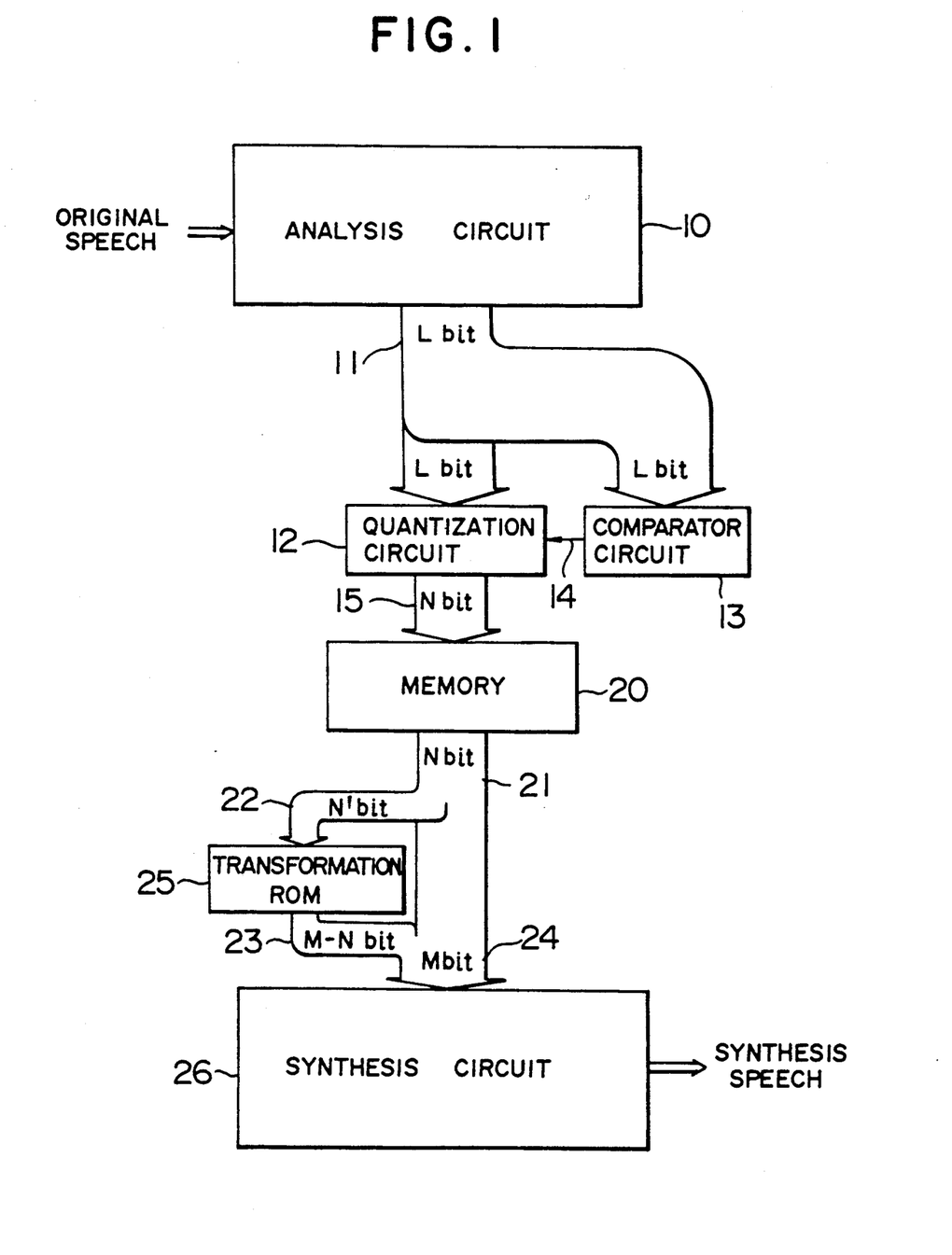
FIG. 1 is a block diagram showing a speech analysis and synthesis device according to a first embodiment of the present invention.

FIG. 1 shows a speech analysis and synthesis device according to a first embodiment of the present invention. A synthesis circuit 10 analyzes input original speech by using a known analysis method, such as LPC, PARCOR, LSP or the Formant method, to extract feature parameter 11 from the original speech. The feature parameter 11 comprises L bits and is represented in floating-point form (called hereinafter "L-bit floating-point form"). The feature parameter 11 is inputted to a quantization circuit 12 and a comparator circuit 13. The quantization circuit 12 quantizes the feature parameter to output a quantization parameter 15 comprising N bits. The comparator circuit 13 compares the value of the feature parameter 11 with a predetermined value. The comparator circuit 13 outputs a control signal 14 to the quantization circuit 12 depending on the result of the comparison by the comparator circuit 13. The quantization circuit 12 quantizes the feature parameter. The interval between adjacent quantization levels is changed depending on whether the control signal 14 is one level or another level. The quantization parameter 15 comprises a smaller number of bits than the feature parameter 11. The quantization parameter 15 is stored in a memory 20.

Human speech is synthesized on the basis of the quantization parameter in the memory 20. The quantization parameter 21 outputted from the memory 20 is inputted to a synthesis circuit 26. N' high-order bits 22 of the quantization parameter 21 are inputted to a transformation ROM 25. The transformation ROM 25 transforms the N' high-order bits 22 of the quantization parameter 21 into an additive parameter 23 of M-N bits on the basis the bit pattern of the N' high-order bits 22. The additive parameter 23 and the quantization parameter 21 are combined to be inputted to the synthesis circuit 26 as a synthesis parameter 24 of M bits. The synthesis circuit 26 synthesizes human speech according to the synthesis parameter 24.

Figure 2A:
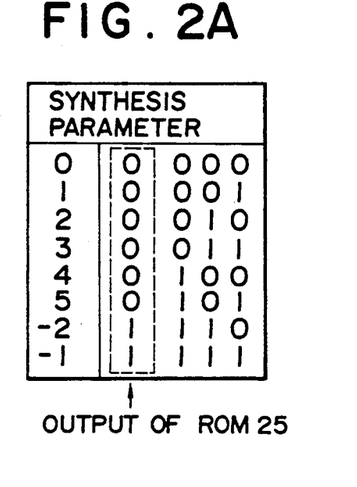
FIGS. 2A, 2B, and 2C are tables showing the synthesis parameter, quantization parameter, and a transformation ROM used in the device of FIG. 1, respectively.
Figure 2B:
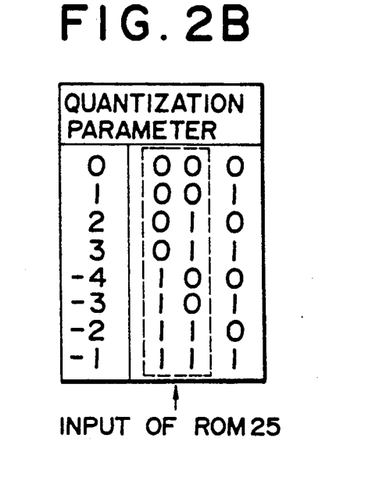
Figure 2C:
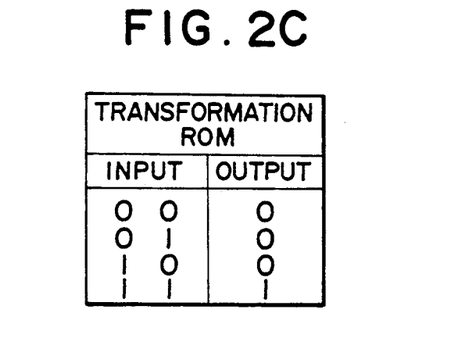

FIGS. 2A, 2B, and 2C show examples of the synthesis parameter, the quantization parameter, and the transformation ROM, respectively. The feature parameter 11 in the L-bit floating-point form ranges from −2 to 5. The quantization circuit 12 quantizes the feature parameter 11 to generate the quantization parameter 15 of 3 bits shown in FIG. 2B. Specifically, the quantization circuit 12 linearly quantizes the feature parameter to generate a parameter of 4 bits and deletes a most significant bit from the parameter to generate the quantization parameter 15 of 3 bits. In the present example, the output of the comparator circuit 13 is unchanged irrespective of the value of the feature parameter 11 and the interval between the quantization levels is unchanged.

The transformation ROM 25 transforms the 2 high-order bits 22 of the quantization parameter 21 into the additive parameter 23 of 1 bit. The content of the transformation ROM is shown in FIG. 2C. When the 2 high-order bits 22 are "11", the additive parameter 23 is "1". When the 2 high-order bits 22 are not "11", the additive parameter 23 is "0". The additive parameter 23 of 1 bit and the quantization parameter 21 of 3 bits are combined to become the synthesis parameter 24 of 4 bits shown in FIG. 2A. The synthesis parameter 24 ranges from −2 to 5 in the same manner as the feature parameter 11. Therefore the synthesis circuit 26 can synthesize substantially the same human speech as the original human speech according to the synthesis parameter 24.

As stated above, the present embodiment makes it possible to transform the quantization parameter being nonlinearly quantized from the feature parameter into the synthesis parameter by using only a transformation ROM of small size.

Figure 3:
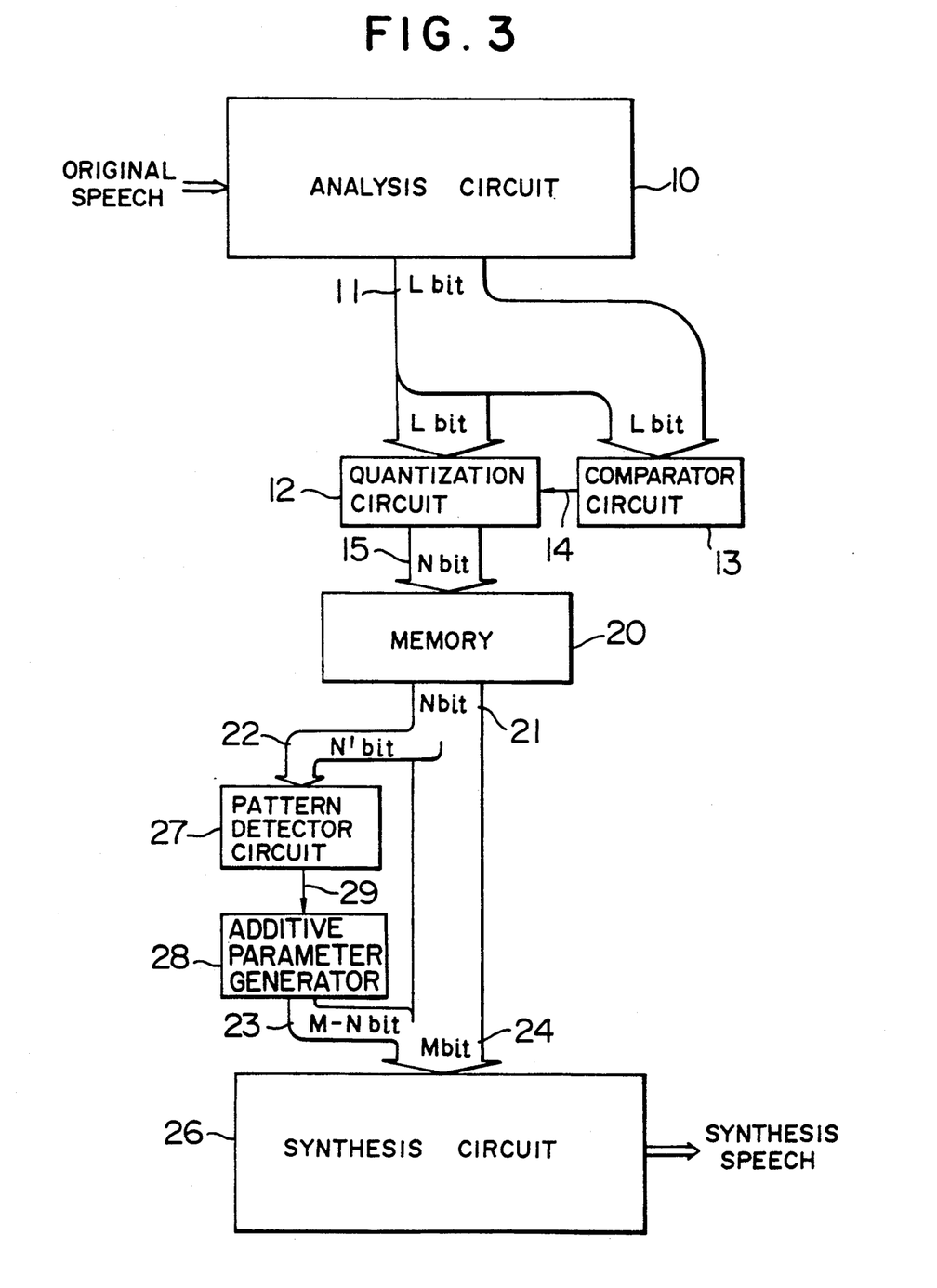
FIG. 3 is a block diagram showing a speech analysis and synthesis device according to a second embodiment of the present invention.

FIG. 3 shows a speech analysis and synthesis device according to a second embodiment of the present invention. The device synthesizes human speech by a method different from the first embodiment. The device comprises a pattern detector circuit 27 and an additive parameter generator 28 instead of the transformation ROM 25. The pattern detector circuit 27 receives N' high-order bits 22 of quantization parameter 21 and detects whether or not the N' high-order bits 22 are a predetermined bit pattern. The pattern detector circuit 27 outputs different control signals 29 to the additive parameter generator 28 depending on the detected result. The additive parameter generator 28 determines the value of the additive parameter 23 of M-N bits depending on the control signal 29. The additive parameter 23 and the quantization parameter 21 are combined to be inputted to a synthesis circuit 26 as a synthesis parameter 24. The synthesis circuit 26 synthesizes human speech on the basis of the synthesis parameter 24.

Figure 4A:
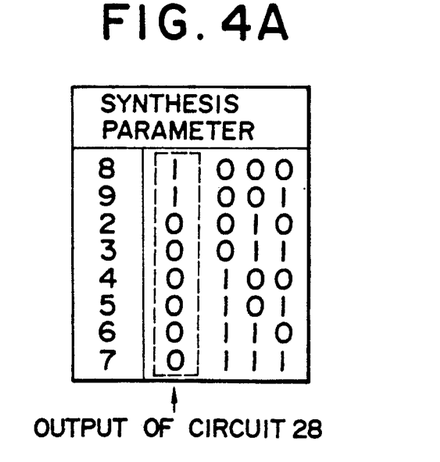
FIGS. 4A and 4B are tables showing the synthesis parameter and quantization parameter used in the device of FIG. 3, respectively.
Figure 4B:
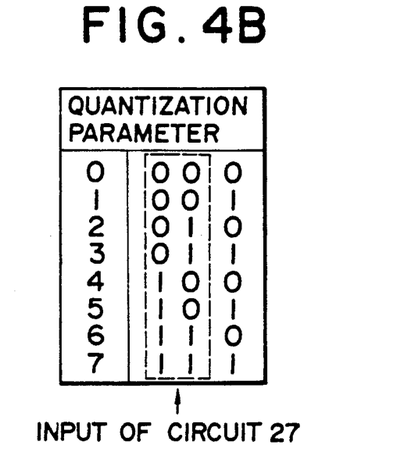

FIGS. 4A and 4B show examples of the synthesis parameter and the quantization parameter, respectively. The feature parameter 11 in the L-bit floating-point form ranges from 2 to 9. The quantization circuit 12 quantizes the feature parameter 11 to generate the quantization parameter 15. Specifically, the quantization circuit 12 linearly quantizes the feature parameter 11 to generate a parameter of 4 bits (an unsigned integer). the most significant bit of the intermediate parameter is deleted to generate the quantization parameter 15 of 3 bits shown in FIG. 4B. The feature parameter 11 having a range from 2 to 9 which is expressed using 4 bits is converted to the quantization parameter 15 of 3 bits.

The quantization parameter 21 is outputted from the memory 20. The pattern detector circuit 27 receives 2 high-order bits 22 of the quantization parameter 21 and detects whether or not the 2 high-order bits 22 have a bit pattern "00", shown in FIG. 4B. The pattern detector circuit 27 outputs one or another level of a control signal 29 to the additive circuit 26 parameter generator 28 depending on the detected result. When the 2 high-order bits 22 are "00", the additive parameter 23 becomes "1". When the 2 high order bits 22 are not "00", the additive parameter 23 becomes "0". The quantization parameter 21 of 3 bits is extended into the synthesis parameter 24 of 4 bits by using additive parameter 23 as the most significant bit, as shown in FIG. 4A. Therefore the synthesis parameter having the range from 2 to 9 which require 4 bits can be obtained from the quantization parameter in the range from 0 to 7 which is expressed by 3 bits.

Instead of the additive parameter generator 28, the device may comprise a bit operator circuit, which performs an operation, such as a logical sum operation, a logical product operation or the like, on the quantization parameter on the basis of the control signal 29 from the pattern detector circuit 27.

As stated above, the present embodiment makes it possible to generate the synthesis parameter from the quantization parameter by using very small circuits.

Where human speech is analyzed and synthesized by using a PARCOR method, a conventional speech analysis and synthesis device linearly quantizes pitch data of the human speech to generate quantization parameters of 7 bits. Therefore, pitch data in the range of 0–127 can be quantized. Pitch data is expressed by a ratio of a basic period (a reciprocal of the basic frequency) of a human voice as a multiple of a sampling period. For example, pitch data usually has a range of 20 to 140 when male voices are sampled at 8 kHz or 10 kHz. However, pitch data of real human speech of 15 or less is never obtained, and male low speech sometimes has pitch data of more than 130. Therefore, the range of the pitch data which the conventional device can quantize does not agree with the range of pitch data of real human speech.

On the contrary, the device according to the present embodiment can quantize the pitch data in the range of 16–143 by using a quantization parameter of 7 bits. As a result, the present embodiment makes it possible to synthesize high grade synthetic speech without increasing the number of bits of the quantization parameter.

Figure 5:
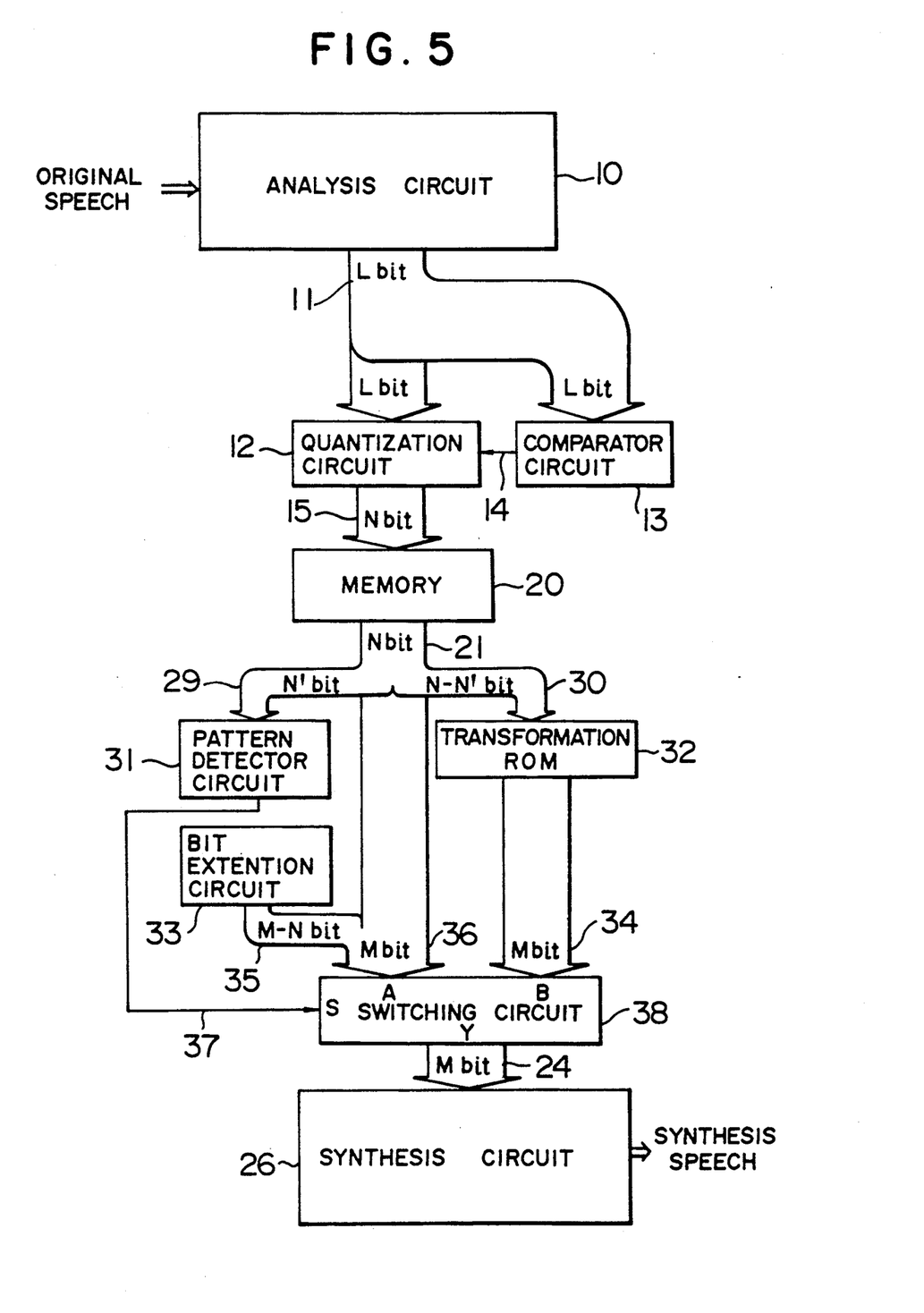
FIG. 5 is a block diagram showing a speech analysis and synthesis device according to a third embodiment of the present invention.

FIG. 5 shows a speech analysis and synthesis device according to a third embodiment of the present invention. In this embodiment, a method of synthesizing human speech from quantization parameters stored in a memory 20 is different from the methods of the above-mentioned embodiments. N' high-order bits 29 of the quantization parameter 21 of N bits are inputted to a pattern detector circuit 31 and N-N' low-order bits 30 of the quantization parameter 21 are inputted to a transformation ROM 32. The pattern detector circuit 31 detects whether or not the N' high-order bits 29 have a predetermined bit pattern. The pattern detector circuit 31 outputs one or another level of control signal 37 to a switching circuit 38 depending on the detected result. The transformation ROM 32 transforms the N-N' low-order bits 30 of the quantization parameter 34 of N bits to generate a transformation parameter 34 of M bits. A bit extension circuit 33 outputs an additive parameter 35 of M-N bits. The additive parameter 35 and the quantization parameter 21 are combined to be inputted to the switching circuit 38 as a parameter 38.

The switching circuit 38 selects a synthesis parameter 24 out of the parameter 36 and the transformation parameter 34 according to the detected result. Specifically, when the N' high-order bits 29 are the predetermined bit pattern, the parameter 36 is selected to be outputted as the synthesis parameter 24. When the N' high-order bits 29 are not the predetermined bit pattern, the transformation parameter 34 is selected to be outputted as the synthesis parameter 24. A synthesis circuit 26 synthesizes human speech on the basis of the synthesis parameter 24.

Figure 6A:
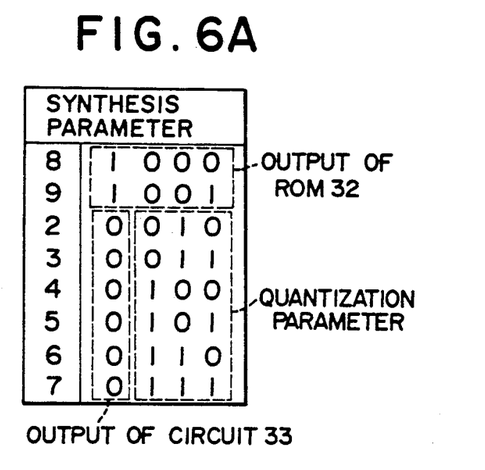
FIGS. 6A, 6B, and 6C are tables showing the synthesis parameter, quantization parameter, and a transformation ROM used in the device of FIG. 5, respectively.
Figure 6B:
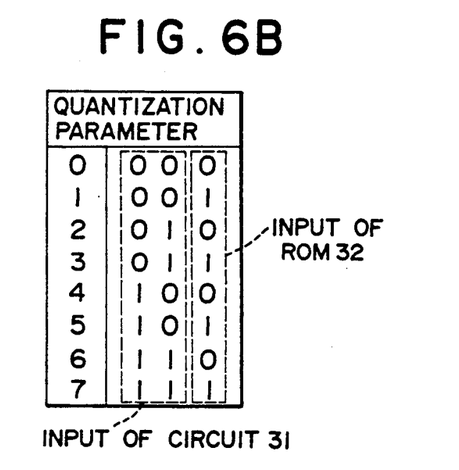
Figure 6C:
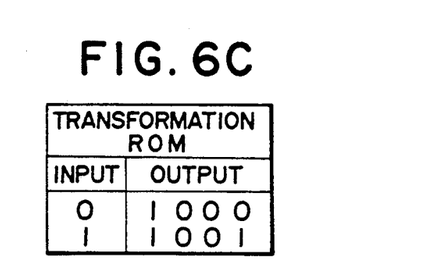

FIGS. 6A, 6B, and 6C show examples of the synthesis parameter 24, the quantization parameter 21, and the transformation ROM 32, respectively. The feature parameter 11 in the L-bit floating-point form ranges from 2 to 9. The quantization circuit 12 quantizes the feature parameter 11 to generate the quantization parameter 15. Specifically, the quantization circuit 12 linearly quantizes the feature parameter 11 to generate a parameter of 4 bits (an unsigned integer) and deletes the most significant bit from the parameter to generate the quantization parameter 15 of 3 bits shown in FIG. 6B.

The quantization parameter 21 is outputted from the memory 20. The pattern detector circuit 31 receives 2 high-order bits 29 of the quantization parameter 21 and detects whether or not the 2 high-order bits 29 have a bit pattern "00". The pattern detector circuit 31 outputs one or another level of control signals 37 to the switching circuit 38 depending on the detected result. The transformation ROM 32 receives the least significant bit 30 of the quantization parameter 21 and transforms the least significant bit 30 into the transformation parameter 34 of 4 bits shown in FIG. 6C. The bit extension circuit 33 outputs the additive parameter 35 of 1 bit, which is "0". The additive parameter 35 and the quantization parameter 21 are combined to be the parameter 36 of 4 bits.

The switching circuit 38 selects the synthesis parameter 24 out of the transformation parameter 34 and the parameter 36 according to the detection signal 37. Specifically, when the 2 high-order bits 29 are "00" the transformation parameter 34 is selected. When the 2 high-order bits 29 are not "00", the parameter 36 is selected. As a result, the synthesis parameter 24 of 4 bits shown in FIG. 6A can be obtained from the quantization parameter 21 of 3 bits shown in FIG. 6B.

Figures 7A, 7C:
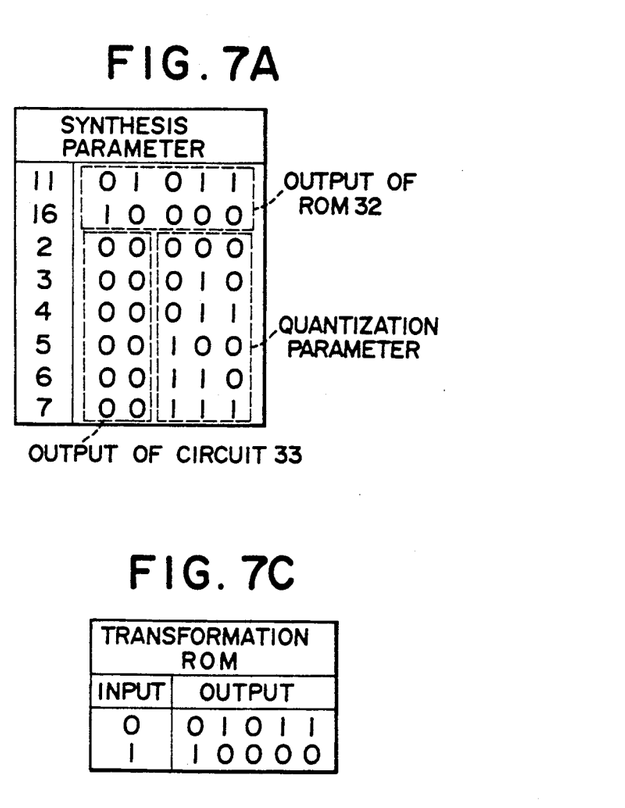
FIGS. 7A, 7B, and 7C are tables showing modifications of the synthesis parameter, quantization parameter, and a transformation ROM used in the device of FIG. 5, respectively.
Figure 7B:
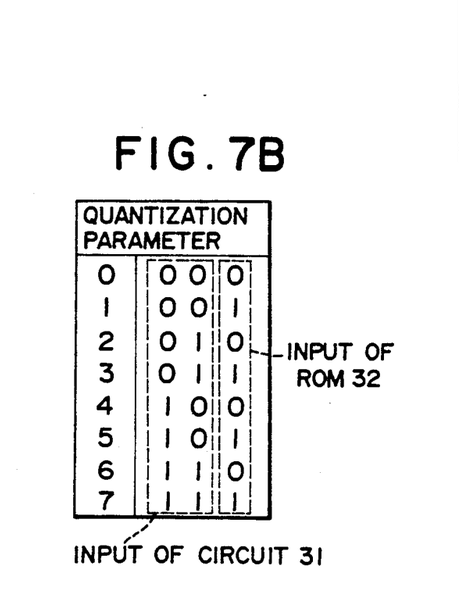

FIGS. 7A, 7B, and 7C show other examples of the synthesis parameter 24, the quantization parameter 21, and the transformation ROM 32. The feature parameter 11 ranges from 2 to 7, 11 and 16. The feature parameter 11 of L bits is quantized to become the quantization parameter 21 of 3 bits. Thus, the feature parameter 11, 16, 2, 3, 4, 5, 6, and 7 are produced from the quantization parameter 0, 1, 2, 3, 4, 5, 6, and 7, respectively. In this case, the numbers 8-10 and 12-15 are not used as the feature parameter. The comparator circuit 13 compares the feature parameter 11 with 7. When the feature parameter 11 is not more than 7, the quantization circuit 12 linearly quantizes the feature parameter 11 to generate parameter 15 of 3 bits (an unsigned integer). When the feature parameter 11 is more than 7, the quantization circuit 12 generates "000" or "001" depending on the value of the feature parameter 11.

The quantization parameter 21 is outputted from the memory 20. The pattern detector circuit 31 receives 2 high-order bits 29 of the quantization parameter 21 and detects whether or not the 2 high-order bits 29 have a bit pattern "00". The pattern detector circuit 31 outputs one or another level of control signals 37 to the switching circuit 38 depending on the detected result. The transformation ROM 32 receives the least significant bit 30 of the quantization parameter 21 and transforms the least significant bit 30 into the transformation parameter 34 of 5 bits shown in FIG. 7C. The bit extension circuit 33 outputs the additive parameter 35 of 2 bits, which is "00". The additive parameter 35 and the quantization parameter 21 are combined to be the parameter 36 of 5 bits.

The switching circuit 38 selects the synthesis parameter 24 out of the transformation parameter 34 and the parameter 36 according to the detection signal 37. Specifically, when the 2 high-order bits 29 are "00", the transformation parameter 34 is selected. When the 2 high-order bits 29 are not "00", the parameter 36 is selected. As a result, the synthesis parameter 24 of 4 bits shown in FIG. 7A can be obtained from the quantization parameter 21 of 5 bits shown in FIG. 7B.

As stated above, the present embodiment makes it possible to obtain the synthesis parameter from the nonlinearly quantized quantization parameter by using only a small transformation ROM.

Where the device quantizes a feature parameter in the range of 16-160 to generate a quantization parameter of 7 bits, the feature parameter in the range of 16-127, is linearly quantized and 15 numbers of the feature parameter. In this case, since the remaining 17 numbers are not necessary to be outputted, these numbers are not allocated in the range of 128-160 are nonlinearly transformed into the quantization parameter in the range of 0-15. When synthesizing, the feature parameter in the range of 0-15 is reversely transformed by the transformation ROM 32.

Figure 8:
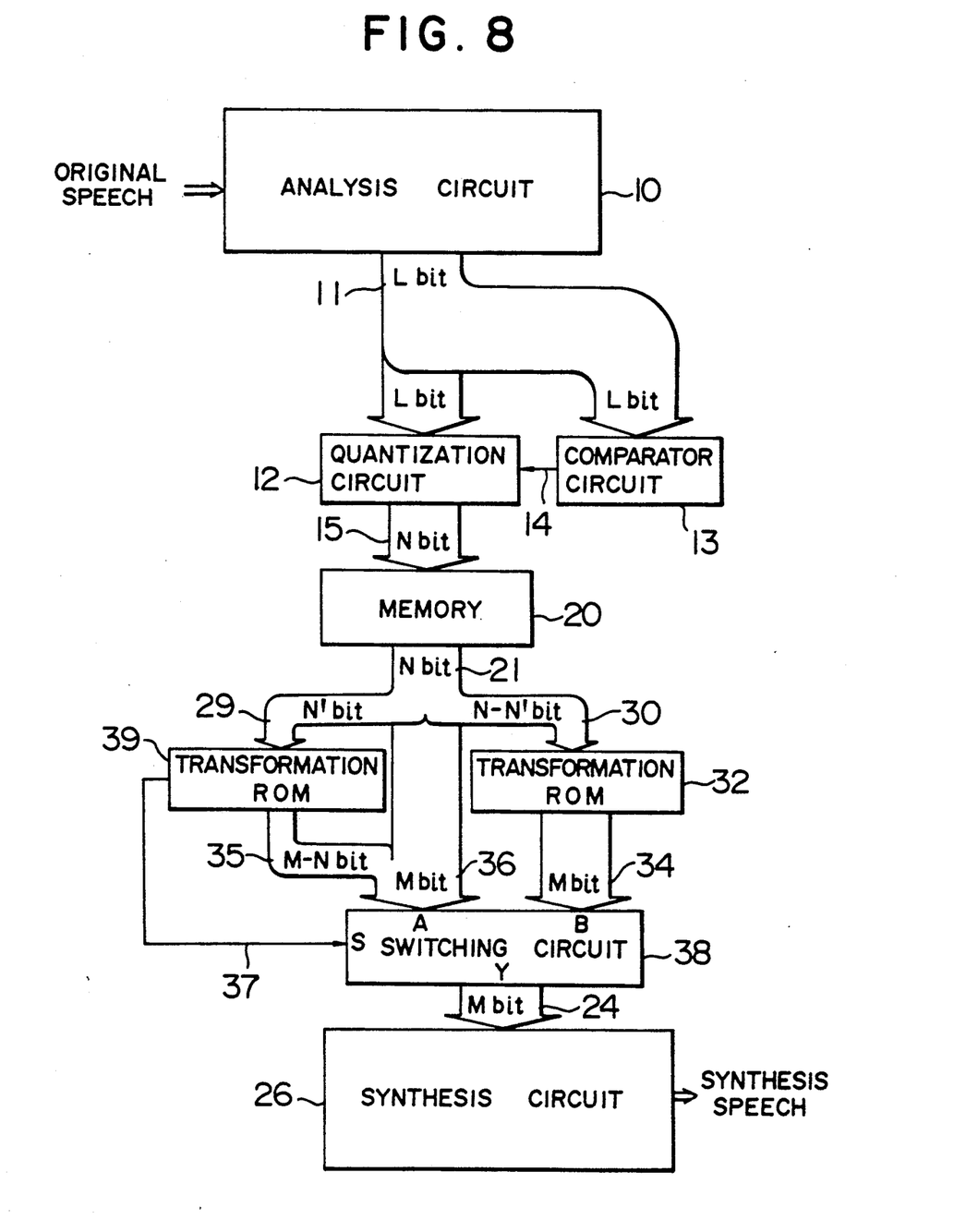
FIG. 8 is a block diagram showing a speech analysis and synthesis device according to a fourth embodiment of the present invention.

FIG. 8 shows a speech analysis and synthesis device according to a fourth embodiment of the present invention. The device comprises a transformation ROM 39 instead of the pattern detector circuit 31 and the bit extension circuit 33 in FIG. 5. The transformation ROM 39 receives N' high-order bits of the quantization parameter 21. The transformation ROM 39 transforms the N' high-order bits into transformation parameter 35 and outputs switching signal 37 to a switching circuit 38. The transformation parameter 35 and the quantization parameter 21 are combined to become parameter 36 of M bits. The switching circuit 38 selects a synthesis parameter 24 out of the parameter 36 and transformation parameter 34 according to the switching signal 37 from the transformation ROM 39. A synthesis circuit 26 synthesizes human speech on the basis of the synthesis parameter 24.

FIGS. 9A, 9B, 9C, and 9D show the functioning of the synthesis parameter 24, the quantization parameter 21, the transformation ROM 32, and the transformation ROM 39, respectively. The feature parameter 11 ranges from 2 to 3, 5, 8. The feature parameter 11 of L bits is quantized to become the quantization parameter 21 of 3 bits. The comparator circuit 13 compares the feature parameter 11 with 3. When the feature parameter 11 is not more than 3, the quantization circuit 12 linearly quantizes the feature parameter 11 to generate parameter 15 of 3 bits (an unsigned integer). When the feature parameter 11 is more than 3, the quantization circuit 12 generates "100" or "101" depending on value of the feature parameter 11.

Figure 9A:
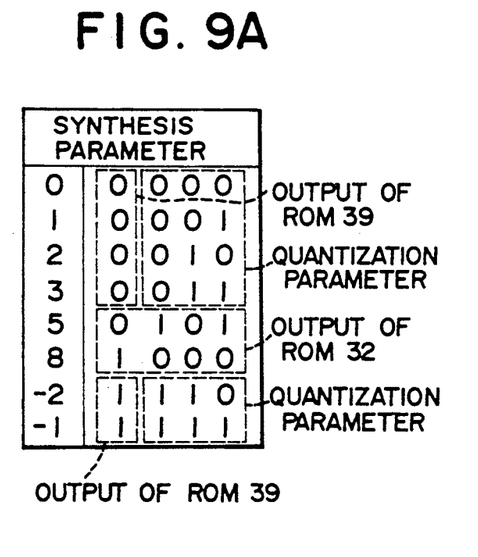
FIGS. 9A, 9B, 9C, and 9D are tables showing a synthesis parameter, quantization parameter, and transformation ROMs used in the device of FIG. 8, respectively.
Figure 9B:
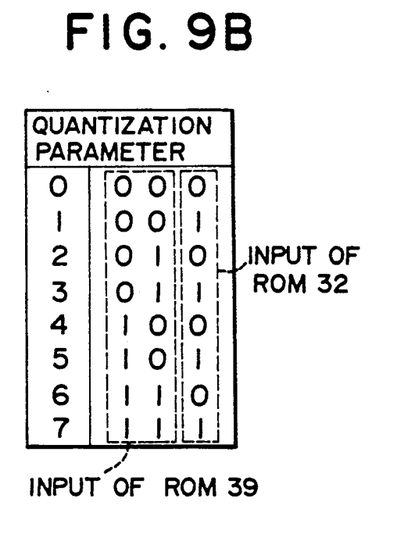
Figure 9C:
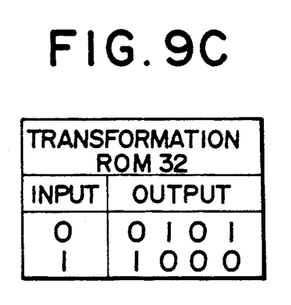
Figure 9D:
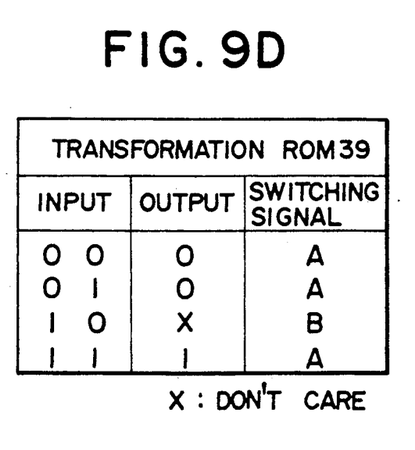

The quantization parameter 21 is outputted from the memory 20. The transformation ROM 39 receives 2 high-order bits of the quantization parameter 21 and transforms the 2 high-order bits into transformation parameter 35 of 1 bit as shown in FIG. 9D. The transformation parameter 35 and the quantization parameter 21 are combined to become the parameter 36 of 4 bits. The transformation ROM 32 receives the least significant bit 30 of the quantization parameter 21 and transforms the least significant bit 30 into the transformation parameter 34 of 4 bits shown in FIG. 9C.

The switching circuit 38 selects the synthesis parameter 24 out of the parameter 36 and the transformation parameter 34 according to the switching signal 37 from the transformation ROM 39. As a result, the synthesis parameter 24 of 4 bits shown in FIG. 9A can be obtained from the quantization parameter 21 of 3 bits shown in FIG. 9B.

As mentioned above, the present embodiment makes it possible to generate the synthesis parameter from the quantization parameter using a very small circuit.

What is claimed is:

1. A method of analyzing and synthesizing human speech comprising the steps of:
    analyzing human speech to extract a pitch parameter from said human speech;
    quantizing said pitch parameter to generate a quantization parameter having a plurality of bits, a part of said plurality of bits of said quantization parameter having a predetermined bit pattern when said pitch parameter is in a predetermined range which exceeds a range expressed by said plurality of bits, said predetermined range corresponding to a range of a human voice;
    transforming said part of said plurality of bits of said quantization parameter into an additive parameter having at least one bit in accordance with said predetermined range;
    combining said additive parameter with another part of said quantization parameter to obtain a synthesis parameter which has a shifted range including said predetermined range and excluding a redundant range not taken by said human voice; and
    synthesizing said human speech on the basis of said synthesis parameter and other feature parameters.

2. An apparatus for analyzing and synthesizing human speech, said apparatus comprising:
    means for analyzing human speech to extract a pitch parameter from said human speech;
    means for quantizing said pitch parameter to generate a quantization parameter having a plurality of bits, a part of said plurality of bits of said quantization parameter having a predetermined bit pattern when said pitch parameter is in a predetermined range which exceeds a range expressed by said plurality of bits, said predetermined range corresponding to a range of a human voice;
    means for transforming said part of said plurality of bits of said quantization parameter into an additive parameter having at least one bit in accordance with said predetermined range;
    means for obtaining a synthesis parameter which has a shifted range including said predetermined range and excluding a redundant range not taken by said human voice by combining said additive parameter with another part of said quantization parameter; and
    means for synthesizing said human speech on the basis of said synthesis parameter and other feature parameters.

3. An apparatus according to claim 2, wherein said transforming means is a ROM having an address terminal inputting said part of bits of the quantization parameter and a data terminal outputting the additive parameter.

4. An apparatus according to claim 2, wherein said transforming means has means for detecting whether or not said part of bits of the quantization parameter has the predetermined bit pattern, and means for determining the value of the additive parameter on the basis of the result of the detection by said detecting means.

5. An apparatus according to claim 2, wherein said part of bits of the quantization parameter has high-order bits in the quantization parameter.

6. An apparatus according to claim 2, wherein the number of bits of the synthesis parameter is more than the number of bits of the quantization parameter.

7. A method of analyzing and synthesizing human speech comprising the steps of:
    analyzing human speech to extract a pitch parameter from said human speech;
    quantizing said pitch parameter to generate a quantization parameter having a plurality of bits, a part of said plurality of bits of said quantization parameter having a predetermined bit pattern when said pitch parameter is in a predetermined range which exceeds a range expressed by said plurality of bits, said predetermined range corresponding to a range of a human voice;
    detecting whether or not said part of said plurality of bits of said quantization parameter has said predetermined bit pattern;
    transforming another part of bits of said quantization parameter into a transformation parameter having a plurality of bits;
    selecting either of said quantization parameter and said transformation parameter as a synthesis parameter in accordance with the result of said detecting, said synthesis parameter having a shifted range including said predetermined range and excluding a redundant range not taken by said human voice; and
    synthesizing said human speech on the basis of said synthesis parameter and other feature parameters.

8. An apparatus for analyzing and synthesizing human speech, said apparatus comprising:

means for analyzing human speech to extract a pitch parameter from said human speech;

means for quantizing said pitch parameter to generate a quantization parameter having a plurality of bits, a part of said plurality of bits of said quantization parameter having a predetermined bit pattern when said pitch parameter is in a predetermined range which exceeds a range expressed by said plurality of bits, said predetermined range corresponding to a range of a human voice;

detecting means for detecting whether or not said part of said plurality of bits of said quantization parameter has said predetermined bit pattern;

means for transforming a remaining part of bits of said quantization parameter into a transformation parameter having a plurality of bits;

means for selecting either of said quantization parameter and said transformation parameter as a synthesis parameter in accordance with the result of detection by said detecting means, said synthesis parameter having a shifted range including said predetermined range and excluding a redundant range not taken by said human voice; and means for synthesizing said human speech on the basis of said synthesis parameter and other feature parameters.

9. An apparatus according to claim 8, wherein said transforming means is a ROM having an address terminal inputting said remaining part of bits of the quantization parameter and a data terminal outputting the transformation parameter.

10. An apparatus according to claim 8, wherein said part of bits of the quantization parameter has high-order bits in the quantization parameter.

11. An apparatus according to claim 8, wherein the number of bits of the synthesis parameter is more than the number of bits of the quantization parameter.

12. An apparatus according to claim 8, further comprising means for extending the quantization parameter length by combining at least one predetermined bit with the quantization parameter to generate an extension parameter, said selecting means selecting either of the extension parameter and the transformation parameter.

13. An apparatus according to claim 12, wherein said transforming means is a ROM having an address terminal inputting said remaining part of bits of the quantization parameter and a data terminal outputting the transformation parameter.

14. An apparatus according to claim 12, wherein said part of bits of the quantization parameter has high-order bits in the quantization parameter.

15. An apparatus according to claim 12, wherein the number of bits of the synthesis parameter is more than the number of bits of the quantization parameter.

16. An apparatus according to claim 8, further comprising means for transforming said part of bits of the quantization parameter into another transformation parameter having additional bits than the quantization parameter, said selecting means selecting either of said another transformation parameter and the transformation parameter.

17. An apparatus according to claim 16, wherein said transforming means is a ROM having an address terminal inputting said remaining part of bits of the quantization parameter and a data terminal outputting the transformation parameter, wherein said another transformation means is a having an address terminal inputting said part of the quantization parameter and a data terminal outputting said another transformation parameter.

18. An apparatus according to claim 16, wherein said part of bits of the quantization parameter has high-order bits in the quantization parameter.

19. An apparatus according to claim 16, wherein the number of bits of the synthesis parameter is more than the number of bits of the quantization parameter.

* * * * *